Patented Feb. 16, 1954

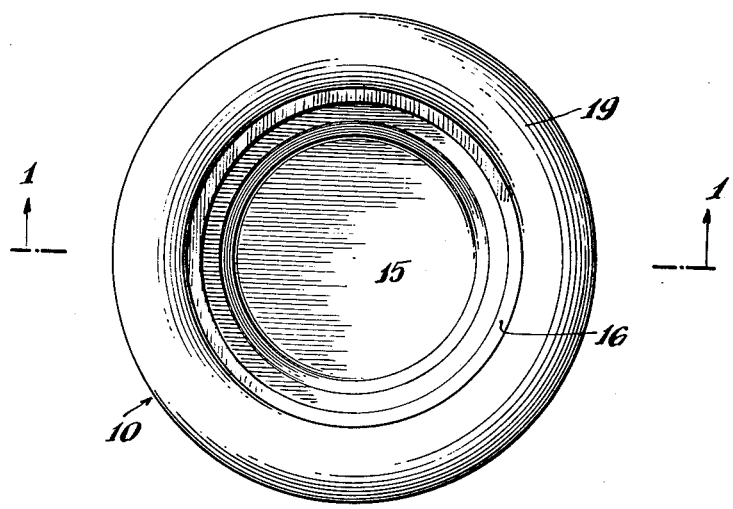
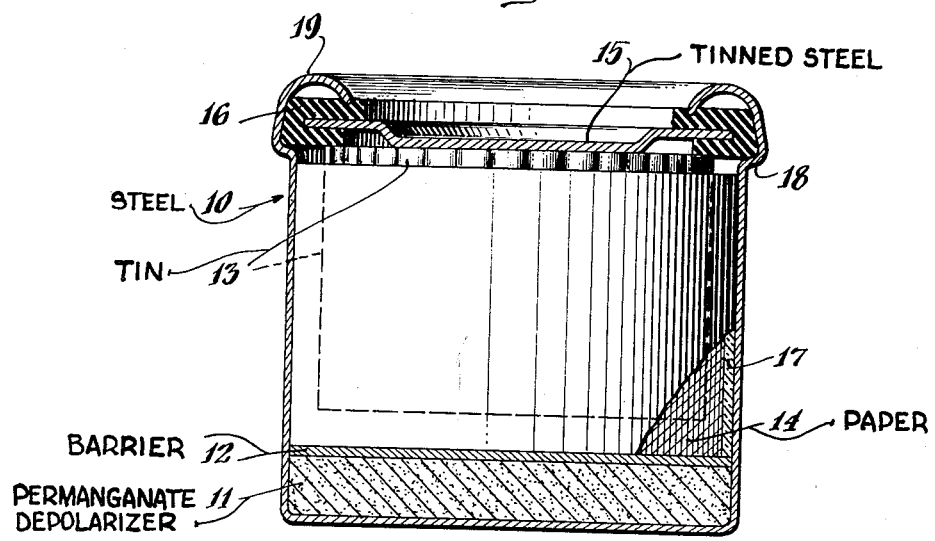

2,669,597

UNITED STATES PATENT OFFICE 2,669,597

ELECTRIC CURRENT PRODUCING CELL WITH TIN ANODE

Samuel Ruben, New Rochelle, N. Y.

Application September 12, 1951, Serial No. 246,259

6 Claims. (Cl. 136—100)

This invention relates to electric current producing cells.

A general object of the invention is the provision of a dry cell to replace the conventional zinc sal ammoniac cells and which does not require the use of zinc or mercury.

An important and specific object is the provision of an efficient primary cell utilizing tin as the anode.

A further object is the provision of an electric current producing cell which can be stored for long periods of time without deterioration and which provides long and continued operation.

A further object is the provision of a primary cell which is substantially free from hydrogen generation, particularly after exhaustion of the depolarizer.

Still another object is the provision of a primary cell which does not utilize zinc but which has a voltage close to that of conventional LeClanche dry cells.

Other objects will be apparent from the disclosure and the drawing in which Fig. 1 is a longitudinal section through a dry cell embodying features of the present invention and Fig. 2 is a top view thereof.

Dry cell batteries as presently commercially manufactured consist of two types. The LeClanche type comprises an anode of zinc, an electrolyte of sal ammoniac and a depolarizer of manganese dioxide; the other type is described in my U. S. Letters Patent No. 2,422,045, and utilizes an anode of amalgamated zinc, an electrolyte of potassium hydroxide and dissolved zinc, and a depolarizer of mercuric oxide.

The voltage of the LeClanche cell is approximately 1.53 volts and that of my mercuric oxide cell approximately 1.34 volts.

The cell of this invention comprises an anode, the main body of which consists of tin, an alkaline electrolyte, such as potassium or sodium hydroxide, and a depolarizer, such as a permanganate. The cell elements are preferably enclosed in a steel container. Where an electrolyte of potassium hydroxide and a depolarizer of potassium permanganate are used, the voltage of the cell is 1.6 volts.

One of the most difficult problems in connection with LeClanche cells is leakage and corrosion which take place after long term storage or after the cell has served its normal operating life. In the alkaline dry cells of my prior patents, generation of hydrogen gas and corrosion due to leaking electrolyte, are for the most part eliminated, due to the nature of the electrolyte used and the balancing of depolarizer with the zinc anode. In some cases, however, where zinc is employed, a piece will break off and, as the potential of zinc in an alkaline cell is 1.317 volts, hydrogen generation at the cathode side after exhaustion of the depolarizer can take place.

An important feature of my present invention is that it is comparatively free from hydrogen generation, particularly after exhaustion of the depolarizer.

The reversible decomposition potential of hydrogen in the electrolyte is $$E_{H_2}, H^+ = .000 - .0592 \log \frac{10^{14}}{7.7 \times 2} = .898 \text{ volt}$$

Electrolyte molality of the hydroxyl ion is 7.7 and its activity coefficient 2. The minimum hydrogen over-voltage on the steel container is .08 volt; where there is any appreciable evolution of hydrogen, it will rise to .15 volt.

The E. M. F. of tin in the electrolyte is 1.0 volt which is insufficient to over-balance the two voltages (.898 + .15 = 1.038 volts), and therefore appreciable generation of gas in a discharged cell is not possible.

The invention is applicable to a variety of cell structures. The wound anode type illustrated in the drawing allows a large effective area and thus tends to prevent polarization due to high current density discharges.

Referring to the drawings, a sealed cell is shown comprising a drawn steel container 10, a cathode depolarizer layer 11 pressed in the bottom thereof, an electrolyte permeable barrier lay 12 covering the cathode surface and a corrugated tin foil anode 13 interwound with a porous paper spacer 14 disposed in the container over the barrier layer. The cell is closed with disk 15 which is sealed in the mouth of container 10 by an insulating grommet 16.

The cathode 11 is formed of an intimate mixture of 70% finely divided potassium permanganate and 30% micronized graphite. The graphite is of the microfine variety and is milled with the permanganate to effect a uniform contact. The mixture is compressed into pellets at 1,000 lbs. per square inch, then granulated to particles of about 20 mesh size and pelleted at a pressure of 2,000 lbs. per square inch. The pellet is consolidated into the steel container at a pressure of 3,000 lbs. per square inch.

I have found that it is important to utilize these relatively low pressures, as with the permanganate depolarizers, incomplete usage of the cathode with premature polarization will occur if very high pressures are used in pelleting and consolidation of the pellet in the container.

The anode-spacer assembly is formed by winding up a strip of corrugated tin foil with interleaved porous paper spacers 14 in offset relation so that the edge of the foil projects slightly from one end of the roll and the edge of the paper projects at the other end of the roll. In a typical cell, the tin foil is 2 mils thick and corrugated to a depth of 8 mils with about 30 corrugations to the inch. The paper is .375 wide and the tin foil .250 wide. The roll is inserted in an impervious insulating sleeve 17 of an alkali resistant plastic, such as polystyrene.

The electrolyte in the described cell consists of a 35% aqueous solution of potassium hydroxide, with which the anodes are impregnated. The barrier 12 is preferably an inorganic or other oxidation and alkali resistant material. It may consist of a ceramic disk, such as a sintered magnesium oxide disk, microporous alkaline and oxidation resistant plastics, such as a microporous disk of styrene, highly parchmentized paper commercially known as Parchkin or porous polyvinylchloride. In the cell described herein, I utilize a barrier disk of porous polystyrene fibre, as described in my Patent No. 2,463,316.

Prior to assembly of the cell, the cathode depolarizer, which weighs 8.6 grams, is allowed to absorb .5 cc of electrolyte. This tends to reduce the absorption from the anode and provide increased capacity.

In assembling the cell, the barrier layer 12 is placed over the surface of the cathode and the electrolyte impregnated anode roll is placed in the container with the projecting paper end in contact with the barrier. Electrolyte from the anode roll readily impregnates the barrier layer. Plastic grommet 16 formed of Neoprene or other suitable inert resilient material is fitted over the edge of top disk 15, formed of tinned steel, and the disk is then placed with its inner face in contact with the projecting edge of tin foil anode 13. Container 10 is provided with a shoulder 18 upon which the grommet rests. The free edge 19 of container 10 is then turned or spun in over the grommet to apply pressure thereto and seal the cell.

Since the cell has the unusual and highly desirable characteristic of generating very little gas in operation and on shelf, sealing problems are greatly reduced and a wide choice of structures is permissible. For instance, in place of the type of anode shown, it would be possible to use perforated disks or sheets, or the tin could be applied by spraying or by compacting tin powder or granules so as to provide an anode of large effective area; the anode could be made by spraying tin on one side of a suitable paper with a free unsprayed margin for spacing; a plastic container could be tin sprayed on its inner wall and the cell made in conventional structure with a bobbin composed of potassium permanganate and graphite with the electrolyte added; the anode could be made in the form of a steel can having a formed tin lining cup fitted therein.

Cylindrical cell structures as shown in my prior patents, No. 2,422,045 or No. 2,463,316, could be utilized, or conventional cylindrical or layer built zinc carbon type structures could be employed.

For normal use, the cells require no venting means. Where abnormal or improper use may occur, a suitable vent may be incorporated in the cell structure.

I have found the combination of a permanganate depolarizer with the tin anode and the hydroxide electrolyte to be particularly useful. In addition to the potassium permanganate, the permanganates of sodium, lithium, strontium, barium, silver and copper can be used as well as other suitable depolarizer material. While the preferred electrolyte is a 35% solution of potassium hydroxide, other alkaline electrolytes, such as sodium or lithium hydroxides or salts which by hydrolysis produce alkaline electrolytes.

As used herein, the term "tin" is meant to include tin and alloys of tin which do not deleteriously react within the cell.

What is claimed is:

1. An electric current producing cell comprising an anode consisting preponderantly of tin, an alkaline electrolyte, and a permanganate depolarizer.

2. An electric current producing cell comprising an anode consisting preponderantly of tin, an alkaline electrolyte, a permanganate depolarizer, and an electrolyte permeable barrier layer interposed between said anode and said depolarizer.

3. A primary cell comprising an anode consisting preponderantly of tin, an oxygen producing permanganate cathode, and an electrolyte comprising a hydroxide of potassium, sodium or lithium.

4. A primary dry cell comprising an anode consisting preponderantly of tin, a depolarizer of potassium permanganate and an electrolyte of potassium hydroxide.

5. An electric current producing cell comprising an anode of extended area consisting preponderantly of tin, an oxygen producing cathode of which the active ingredients is a permanganate, and an electrolyte of potassium hydroxide.

6. A primary dry cell comprising a steel container having therein an anode, the main body of which consists preponderantly of tin, a cathode-depolarizer comprising a consolidated mixture of potassium permanganate and graphite, and an electrolyte of potassium hydroxide.

SAMUEL RUBEN.

References Cited in the file of this patent

UNITED STATES PATENTS

| Number | Name | Date |
| --- | --- | --- |
| 718,927 | Gould | Jan. 20, 1903 |
| 2,422,045 | Ruben | June 10, 1947 |
| 2,463,316 | Ruben | Mar. 1, 1949 |

FOREIGN PATENTS

| Number | Country | Date |
| --- | --- | --- |
| 297 | Great Britain | Jan. 20, 1882 |
| 32,489 | Switzerland | Nov. 17, 1904 |